April 3, 1934.   A. W. BULL   1,953,150
PROCESS FOR SEPARATING RUBBER AND FIBER
Filed Aug. 22, 1930
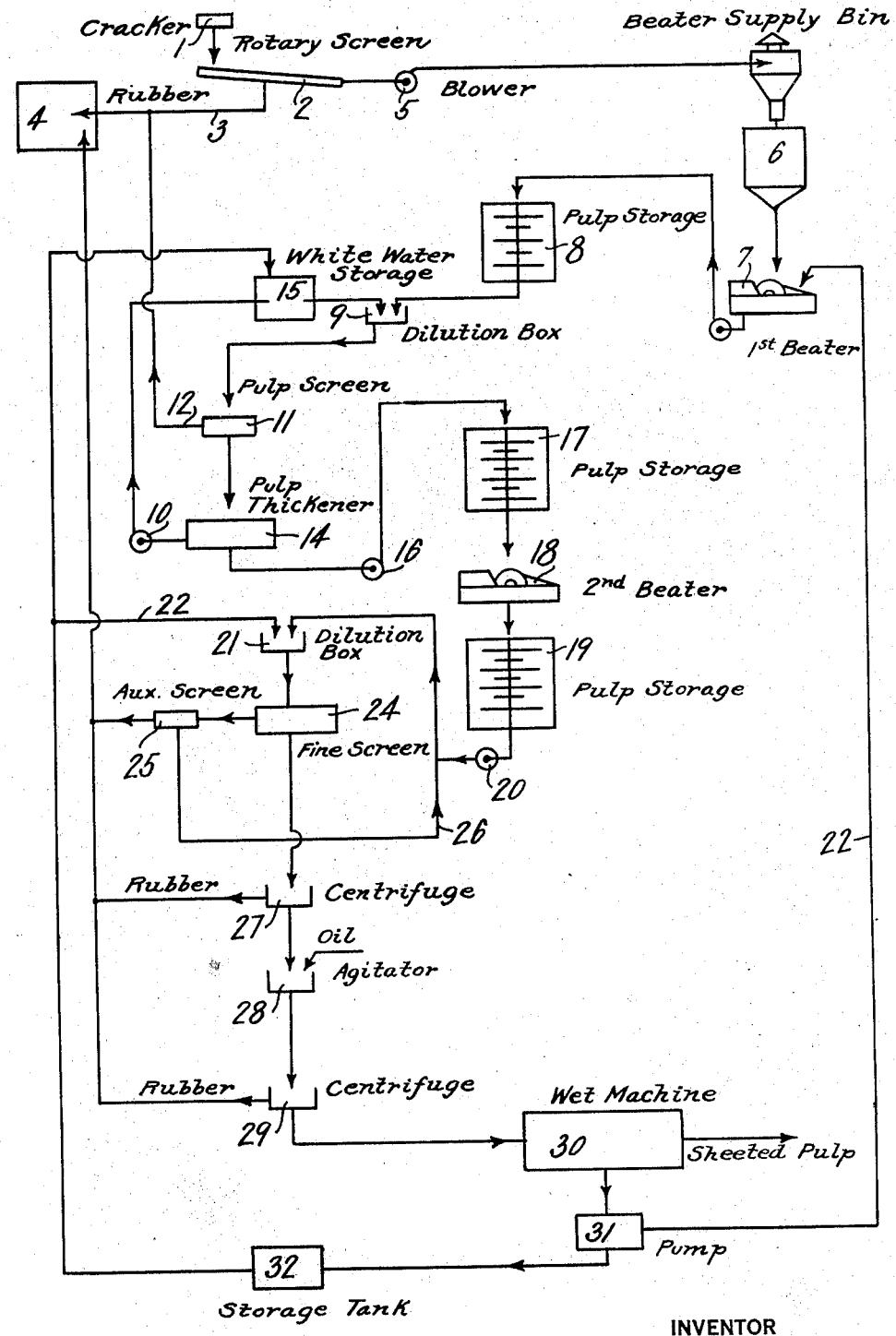
INVENTOR
Arthur W. Bull
BY
Walter L. Pipes.
ATTORNEY Patented Apr. 3, 1934

1,953,150

UNITED STATES PATENT OFFICE 1,953,150

PROCESS FOR SEPARATING RUBBER AND FIBER

Arthur W. Bull, Naugatuck, Conn., assignor to Rubber Regenerating Company, Naugatuck, Conn., a corporation of Indiana Application August 22, 1930, Serial No. 477,140

7 Claims. (Cl. 18—52)

My invention relates to methods for separating rubber from fibers secured thereto, and more particularly to the separation of rubber from fabric to which it has been secured, as by a vulcanizing operation, and the recovery of the fibers from the fabric.

Many rubber articles are composed of bodies or strips of fabric to which rubber is secured either by impregnating or by a curing operation, such as vulcanizing. When such articles have become worn it is often desirable to recover the rubber and use it in subsequent manufacture. It is also desired to recover rubber from scrap material which is incidental to the manufacture of such articles.

Heretofore attempts have been made to strip rubber from such fabrics by combined pulling, tearing and/or cutting operations. Rubber has also been recovered by putting the material containing both the rubber and fabric into digesters and subjecting the material to the action of caustic soda or the like, which destroys the fabric and leaves the rubber. However, the latter operation destroys the value of the fabric itself.

In certain rubberized articles, particularly vehicle tires, the fibers from which the fabric is made are selected with particular care. In the case of automobile tires, the fibres are particularly long cotton fibers of considerable value. The recovery of such fibers while freeing rubber from them, even after the curing or vulcanization of the rubber, is a matter of considerable commercial importance.

I provide a method and apparatus for separating rubber, and particularly vulcanized rubber, from fabric to which it is secured and at the same time recover a high percentage of the fiber in a condition such that it can again be used. In carrying out my process, which is useful both for vulcanized and unvulcanized rubbers, although it is particularly adapted for vulcanized rubber, the fabric and rubber are mechanically broken down or crushed until units approximating one inch in their major dimensions are obtained. The material is passed over a screen of a suitable mesh to permit the escape of the fine rubber which is freed during the crushing operation. The fiber and remaining rubber are fed to a beater containing a liquid, such as water, although it is to be understood that agents which are not deleterious to the fabric may be introduced to the beater to be used in freeing the rubber from the fabric. After the material is worked in the beater for a sufficient length of time to free most of the rubber from the face of the fabric and to commence the disintegration of the fabric into fibers, the material is passed over a screen which removes the free rubber. The material is subjected to a second beating which loosens the smaller particles of rubber adhering to the fabric and completes the disintegration of the fabric into fibers.

After the second beating and a subsequent screening, the remaining rubber no longer adheres to the fibers in the pulp, although a considerable quantity of the rubber is intermixed with the pulp. Some of this rubber is removable by a gravitational action, or by centrifuging. The pulp may then be treated with an oil and agitated so that the rubber particles float freely on the pulp. The particles may be separated by a second gravitational action, such as by skimming, or by centrifuging, until the fibers are substantially free from rubber. The pulp may then be passed to a wet felting machine or the like where the fibers are made into a sheet.

In my process the steps are primarily mechanical steps, and all of the steps subsequent to the first screening step are accomplished without drying the pulp. This distinguishes from the subject matter of my co-pending application Serial No. 396,934, filed October 2, 1929. In the subject matter of that application the final separation between the rubber and fiber is accomplished by drying the pulp and then picking the rubber from the fibers.

In the present application the second beating operation is carried on after the removal of a large percentage of the original rubber so that the beater blades are more effective in their action in separating the fibers from the fabrics, owing to the absence of a considerable amount of rubber. The removal of the rubber eliminates fine grinding thereof. The presence of finely ground rubber particles near the end of the process would entail considerably more difficulty in the final separation of the rubber and fibers.

The accompanying drawing is a diagrammatic view of a present preferred arrangement of apparatus for practicing the method of the present invention, although it is to be understood that the apparatus illustrated and hereinafter described is by way of example and not a limitation of the invention.

In practicing my invention, fabric to which rubber is secured is placed in a cracking machine 1, such as a rubber mill, an attrition mill or hammer mill, and milled until the rubber and fabric is reduced to sizes not larger than one inch in their major dimensions. This method is particularly adapted for use with rubber which has previously been cured or vulcanized. The material may be in the form of scraps or tire carcasses from which the metal bead rings have been removed. It is to be understood that the source of the materials may vary widely within the spirit of the invention.

In the case of beadless tires the material after cracking may contain approximately 80% of rubber and 20% of cotton. This cracked material is then run over a screen having mesh sizes of from four to eight to the inch. A screen having six meshes to the inch has been found to give very good results. The screen may be of a rotary vibratory type of which there are a number on the market. The vibratory motion is preferably transmitted in the plane of the screen. This operation removes from 12% to 18% of the free rubber which is carried by a conveyor or other means 3 to a digester 4. The rubber is practically free from fibers but such fibers as adhere to the rubber are reduced by the presence of caustic soda, or the like, in the digester 4. Substantially all of the fabric is rejected by the screen. If 15% of the original weight of the material escapes through the screen 2, the remaining material is approximately sixty-five parts of rubber to twenty parts of fabric. The material rejected by the screen 2 is transferred by a blower 5 or the like, to a beater supply bin 6 where it is stored pending its being charged into a beater.

From the supply bin 6 a charge of the material is placed in a primary beater 7 where it is diluted with a liquid. The liquid used is preferably "white water", or water which has been used in previous operations and which contains a percentage of fibers which it is desired to save by again passing them through a subsequent apparatus. By using the white water over and over again substantially all of the fibers can be recovered, which fibers would be lost were fresh water used at each wet stage of the process. The mixture is diluted with sufficient amount of the liquid to properly fill the beater 7.

The purpose of the beating operation is to strip off most of the rubber attached to the fabric and/or fibers and to initiate the separation of the fabric into its component fibers. The beating may last for approximately one to four hours or longer. The exact time of the beating varies in accordance with the quality of fibers which it is desired to recover and with the condition, size and speed of the beater. A severe initial beating tends to break up and shorten the fibers. The primary beater 7 may be of any suitable type of beater, of which there are a number on the market for beating pulp. The beating action is purely mechanical and is brought about by a rubbing action between bars on a beater roll or rolls and bars in the bedplate of the machine past which the pulp circulates. The beater is usually given an oval shape and divided longitudinally in the direction of its major axis to provide a circuitous path for the pulp.

At the end of the beating operation the pulp is transferred to a storage tank 8. From the storage tank 8 the pulp is fed to a dilution box 9 where the pulp is diluted so that the fiber concentration is very low, for example, $\frac{3}{10}$ of 1% of the whole mixture. In such a case, a sample mixture will contain about sixty-five parts of rubber, twenty parts of fiber and eight thousand to ten thousand parts of water. The only limit to the maximum amount of water which can be added is that which can be removed by screening. For an economical operation, however, it is desirable that only sufficient water to effect the screening shall be added. The water added is preferably white water derived from a pump 10, the operation of which is hereinafter described.

The diluted pulp is then passed through a pulp screen 11. Such a screen may have slots of the order of fifty thousandths of an inch in width, which screens are standard in the paper industry. This screen separates the rubber particles having a width in excess of fifty thousandths of an inch from the fibers before a subsequent beating operation. By separating the freed rubber at the end of the first beating operation the capacity of a second beater, with respect to the fiber, is greatly increased owing to the absence of a large excess of rubber. The removal of the rubber at this stage also prevents excessive grinding of the rubber into small particles which would necessarily have to be separated at a later stage in the process. The rejected rubber is carried by a conveyor system 12 to the digester 4.

The percentage of rubber removed by the pulp screen 11 varies considerably depending upon the intensity of the beating action in the beater 7. An exemplary average removal of rubber in the stock is two-thirds of the rubber which, according to the exemplary ratio previously given, would reduce the rubber passing through the screen to approximately twenty-five parts. There is a slight loss of fiber through the screen which may be considered to reduce the fiber content to eighteen parts. The resulting exemplary ratio existing after the screening is twenty-five parts of rubber to eighteen parts of fiber.

From the pulp screen 11 the pulp passes to a pulp thickener 14 which reduces the liquid in the mixture to about 94% of liquid to 6% fiber and rubber. The thickening is done for the reason that subsequent beating must be accomplished at a higher consistency of the pulp than the consistency for the screening operation. Such beating consistencies vary from 4% to 8% suspended solids and 96%–92% water. The pump 10 extracts the excess liquid from the thickener 14 and returns it to the dilution box 9. A storage tank 15 may be supplied between the pump 10 and the dilution box 9, if desired. From the pulp thickener 14 the pulp passes through a pump 16 to a storage tank 17. The storage tank supplies pulp to a second beater 18 which is similar to the primary beater 7. The function of the beater 18 is to complete the stripping of the rubber particles from the fabric and fibers and to complete the disintegration of the fabric and constituent cords into fibers. This beating operation may take five hours or more or until there is no union between the rubber and fiber, so that the fiber can subsequently be separated by a screening and/or gravitational operation.

From the beater 18 the pulp passes to a storage ank 19 from which it is moved by a pump 20 to a second dilution box 21. The dilution box 21 is supplied with white water by a pipe line 22 which may be connected to a pump system, hereinafter described.

In the dilution box 21 the pulp is diluted so that the fiber shall not exceed a concentration of from $\frac{2}{10}$% to $\frac{3}{10}$%. From the dilution box the pulp passes to a fine screen 24 having slots ten thousandths of an inch or less in width. The rubber and fiber rejected by the screen 24 are passed to an auxiliary screen 25. The screen 25 is of the same construction as the other screens, except that its capacity is smaller, and the slots are somewhat wider than the slots in the fine screen 25. The purpose of the auxiliary screen 25 is to recover the fiber rejected with the rubber by the screen 24. The rejects from the screen 25 are sent to the digester 4. The white water recovered from the screen 25 is preferably returned to the dilution box 21 by a pipe line 26.

The pulp passing through the screen 24 is conveyed to a centrifuge 27 for a separating operation. In the centrifugal machine the heavier particles of rubber are forced to the outside of the bowl of the centrifuge and the pulp flows from the machine. Some of the lighter particles of rubber may also be retained in the bowl. The bowl is cleaned intermittently to recover the rubber which is sent to the digester 4 by any suitable means.

From the centrifuge 27 the pulp passes to an agitator 28 in which various oils may be added for "wetting" the rubber. The particles of oil adhere to the surfaces of the rubber and thereby affect the apparent density of the rubber particles. Oils such as pine oils, solvent naphtha, fuel oil, or distillation products of pine oil, such as pinesol and solvenol, may be used. The oil may vary from one-half pint to a quart or more per thousand gallons of pulp. The floating rubber may be skimmed from the agitator and sent to the digester and, in this case, the agitation must be quite mild during skimming to prevent the scum from being redispersed through the mixture. Preferably, however, the pulp is taken from the agitator 28 and passed through a second centrifuge 29 in which the lighter rubber particles are separated from the pulp which is then clean. When the centrifuge 29 is used the preceding agitation with oil should be vigorous and thorough to insure the wetting of all rubber particles by the oil. The rubber particles are returned to the digester 4. The type of centrifuge 28 may be either such as to give a continuous discharge of the rubber and a continuous discharge of the pulp, or to give a continuous discharge of the rubber and require the intermittent removal of the fiber. Both types of centrifuges are available on the market.

From the centrifuge 29 the pulp passs to a wet felting machine 30. The machine 30 preferably consists of a rotating cylindrical screen running in a vat containing the pulp. As the screen rotates a filling of fiber is deposited on its surface as the water passes through the screen surfaces and out of one end. A felt belt presses against the cylinder above the surface of the water and the fibers adhere to this felt. The felt carries the fibers across a suction box where more of the water is removed and then to a pair of squeezer rolls where the layer of fiber is wound up as a layer of damp pulp. This layer is cut off from time to time from the squeezer rolls and represents the finished fiber product from the process.

The white water from the wet machine 30 passes through a pump 31 to the pipe line 22. The pipe line 22 is also connected to the primary beater 7. A storage tank 32 may be provided in the pipe line 22, if desired.

The foregoing process is continuously operable in the sense that most of the units operate continuously as distinguished from operating all of the units in fixed cycles. The beating is, of course, done in stages. However, by the use of the storage tanks the screens may be operated continuously. The condition of the fibers is controlled to a considerable extent by the adjustment of the beaters 7 and 18. When it is desired to produce a short fiber, the beating rolls can be lowered rapidly. However, to produce the longer fibers the rolls are lowered relatively slowly which requires a longer beating time. Owing to the absence of harmful chemical agents in the process, the fibers recovered are in a condition to be reused. This process is particularly advantageous in recovering the long cotton fibers used in tire casings.

It is to be understood that the mathematical data given throughout this specification is by way of explanation and not by way of limitation of the invention, as various changes may be made in the working ranges of different machines and process steps.

While I have shown and described a present preferred method and apparatus for separating rubber and fibers, it is to be understood that the invention may be otherwise embodied and practiced within the spirit of the invention and scope of the appended claims.

Having thus described my invention, what I claim and desire to protect by Letters Patent is:

1. In the method of separating rubber from fiber, the steps comprising subjecting a dilute, pulped mixture of fiber and rubber to a centrifuging operation to separate rubber from the fiber, subjecting the recovered fiber and rubber content to a treatment for varying the effective density of the remaining rubber, and then subjecting the recovered fiber and rubber to another centrifuging operation to further free the fiber from rubber.

2. In the method of separating rubber from fiber, the steps comprising subjecting a dilute, pulped mixture of fiber and rubber to a centrifuging operation to separate rubber from the fiber, subjecting the recovered fiber and rubber content to a treatment for varying the effective density of the remaining rubber, subjecting the recovered fiber and rubber to another centrifuging operation to further free the fiber from rubber, and collecting the cleaned fiber.

3. In the method of separating rubber from fiber, the steps comprising subjecting a dilute, pulped mixture of fiber and rubber to a gravitational separating action, subjecting the recovered fiber and rubber content to a treatment for varying the effective density of the remaining rubber, and subjecting the recovered fiber and rubber to another separating action to further free the fiber from the rubber.

4. In the method of separating rubber from fiber, the steps comprising treating a dilute, pulped mixture of fiber and rubber with an oil to change the apparent density of the rubber particles and then subjecting the mixture to a centrifuging operation to separate the fiber.

5. In the method of separating fiber from rubber, the steps comprising beating a mixture of rubber and fiber, diluting the mixture, screening the mixture to remove the coarser particles of free rubber, concentrating the screened fiber and rubber, and rebeating the concentrate.

6. In the method of separating rubber from fibers secured thereto, the steps comprising reducing a mass of rubber and fibrous material to a condition of pulp, partially separating the rubber from the fiber, separating the remaining rubber by a centrifugal operation, and compacting the fibers.

7. In the method of separating rubber from fiber, the step comprising subjecting a dilute, pulped mixture of fiber and rubber to a gravitational separating action, subjecting the recovered fiber and rubber content to a treatment for varying the effective density of the remaining rubber, and subjecting the recovered fiber and rubber to a centrifugal separating action to further free the fiber from the rubber.

ARTHUR W. BULL.